US011572508B2

(12) United States Patent
Sherman et al.

(10) Patent No.: US 11,572,508 B2
(45) Date of Patent: Feb. 7, 2023

(54) NON-LINEAR SURFACTANT

(71) Applicant: Powdermet, Inc., Euclid, OH (US)

(72) Inventors: Andrew Sherman, Mentor, OH (US); Brian Werry, Euclid, OH (US)

(73) Assignee: POWDERMET, INC., Euclid, OH (US)

( * ) Notice: Subject to any disclaimer, the term of this patent is extended or adjusted under 35 U.S.C. 154(b) by 105 days.

(21) Appl. No.: 17/237,404

(22) Filed: Apr. 22, 2021

(65) Prior Publication Data

US 2021/0237013 A1 Aug. 5, 2021

Related U.S. Application Data

(62) Division of application No. 16/433,868, filed on Jun. 6, 2019, now Pat. No. 11,273,422.

(60) Provisional application No. 62/681,922, filed on Jun. 7, 2018.

(51) Int. Cl.
*B01F 17/00* (2006.01)
*C08K 13/04* (2006.01)
*C09K 8/584* (2006.01)
*C09K 23/00* (2022.01)

(52) U.S. Cl.
CPC ............ *C09K 23/002* (2022.01); *C09K 23/00* (2022.01); *C09K 23/003* (2022.01); *C08K 13/04* (2013.01); *C09K 8/584* (2013.01)

(58) Field of Classification Search
CPC .............. B01F 17/0007; B01F 17/0014; B01F 17/0021
See application file for complete search history.

(56) References Cited

U.S. PATENT DOCUMENTS

| 5,462,791 | A | * | 10/1995 | Kashima | ................. | B29C 70/22 |
| | | | | | | 442/244 |
| 10,016,451 | B2 | * | 7/2018 | Edelson | ............. | A61K 31/7105 |
| 11,273,422 | B2 | * | 3/2022 | Sherman | ................. | C08J 5/045 |
| 2003/0121529 | A1 | * | 7/2003 | Sachdev | ................. | C11D 3/43 |
| | | | | | | 134/28 |

(Continued)

OTHER PUBLICATIONS

US Search Authority, Int'l. Search Report and Written Opinion for corresponding application PCT/US2019/035817 (dated Oct. 2019).

(Continued)

*Primary Examiner* — Liam J Heincer
*Assistant Examiner* — M. Reza Asdjodi
(74) *Attorney, Agent, or Firm* — Ulmer & Berne LLP; Brian E. Turung

(57) ABSTRACT

A non-linear surfactant, and particularly a non-linear surfactant comprising bi-functionalized molecules or particles having both hydrophobic and hydrophilic groups. The non-linear surfactant includes a nanoparticle template of a rigid molecular structure, wherein the nanoparticle comprises a molecule or a particle that is bi-functionalized with both hydrophilic and hydrophobic groups to obtain an amphiphilic nanoparticle. The template nanoparticle can be used as a surfactant, wetting agent, emulsifier, detergent or other surface active agents or for the preparation of nanoemulsions or dispersions. The non-linear surfactant can provide smaller particle sizes for emulsion suspensions and foams.

15 Claims, 3 Drawing Sheets

(56) References Cited

U.S. PATENT DOCUMENTS

| | | | | |
|---|---|---|---|---|
| 2006/0042020 A1* | 3/2006 | Salmon | ............... | D06M 16/003 |
| | | | | 8/115.51 |
| 2006/0100177 A1* | 5/2006 | Nishimura | ........... | A61K 31/665 |
| | | | | 549/216 |
| 2008/0009430 A1* | 1/2008 | Hecht | ...................... | C11D 1/83 |
| | | | | 510/352 |
| 2011/0177156 A1* | 7/2011 | Szoka, Jr. | .............. | A61Q 19/00 |
| | | | | 424/649 |
| 2011/0305734 A1* | 12/2011 | Edelson | .................. | A61P 19/04 |
| | | | | 977/773 |
| 2015/0209198 A1* | 7/2015 | Aizenberg | ............ | A61F 13/537 |
| | | | | 428/137 |
| 2016/0335401 A1 | 11/2016 | Kawai et al. | | |
| 2016/0355401 A1* | 12/2016 | Suh | ........................ | C01G 41/02 |
| 2021/0237013 A1* | 8/2021 | Sherman | .............. | C09K 23/002 |

OTHER PUBLICATIONS

Werry, Brian Scott, "Characterizing Bile Acid Association as a Ligand and in Micellization," Dissertation, Case Western Reserve University (Jan. 2014).

\* cited by examiner

Non-Linear Molecular Surfactants Example

Traditional Surfactants Example

Traditional Surfactants

Planar Surfactants

NON-LINEAR SURFACTANT

The present disclosure is a divisional of U.S. application Ser. No. 16/433,868 filed Jun. 6, 2019, which in turn claims priority to U.S. Provisional Application Ser. No. 62/681,922 filed Jun. 7, 2018, the disclosures of which are incorporated herein by reference.

FIELD OF THE DISCLOSURE

The present disclosure generally relates to a non-linear surfactant, and particularly to a non-linear surfactant comprising bi-functionalized molecules or particles having both hydrophobic and hydrophilic groups. The non-linear surfactant includes a nanoparticle template of a rigid molecular structure, wherein the nanoparticle comprises a molecule or a particle that is bi-functionalized with both hydrophilic and hydrophobic groups to obtain an amphiphilic nanoparticle. The template nanoparticle can be used as a surfactant, wetting agent, emulsifier, detergent or other surface active agents or for the preparation of nano-emulsions or dispersions. The non-linear surfactant can provide smaller particle sizes for emulsion suspensions and foams.

BACKGROUND OF THE DISCLOSURE

The interface between phase boundaries can be of several types depending on whether the adjacent phases are a solid, a liquid, or a gas. Generally, the most common are interfaces between either a liquid-liquid, liquid-solid, liquid-gas, solid-solid, or multiple combinations of these types of phase interface interactions. Within these phases are the interfacial interaction differences that are found between hydrophilic, hydrophobic, lipophilic, siliphilic, and fluorophilic interactions.

The phenomena of interfacial interactions between substances is a significant part of our daily lives. Our very biological makeup relies on these interactions. These interfacial interactions include the formation and stability of emulsions, and the dispersions of insoluble particles into a liquid medium to form suspensions.

Surfactants are used to lower surface tensions between immiscible phases by favorably interfacing with both phases. Surfactants contain two or more different chemical interfacing regions. These interfacing regions are made up of chemical moieties that have favorable interactions with similar intermolecular forces. The types of interaction include ionic attraction, hydrogen bonding, dipole-dipole forces, and London forces.

The most general type of surfactant is amphiphilic, in which the molecular structure possesses a hydrophobic region (non-polar) and a hydrophilic region (polar), "water disliking" and "water liking" respectively. Possessing regions of opposite characteristics enables the surfactant to be soluble in both organic solvents and water.

A surfactant's bi-intermolecular force nature enables it to reside in-between the interfacial boundaries of two immiscible materials, thus lowering surface tension generated between the two material phases. When two materials are immiscible, they possess no intermolecular force interactions, which creates a molecular environment with restrictions—a surface barrier. This restriction in molecular freedom creates an area of potential intermolecular tension, i.e. surface tension. If the two liquids mixed are completely miscible (having molecular interactions that are alike), then no interfacial tension exists between them.

Surfactants act at the surface between the mixing materials. Within an emulsion system, the surfactants lower the surface energy experienced by the mixture system, thus enabling the immiscible phases to disperse throughout the solution mixture. For example, in a common surfactant detergent, the hydrophilic region faces and interacts with the water matrix and the hydrophobic region faces and interacts with the organic matrix. These interactions in an emulsion dispersion act to stabilize suspended particle forms that include spherical and cylindrical micelles, and bilayers.

The surfactant's dual interfacial properties enable it to behave as a wetting agent on solid surfaces and a foaming agent between gas-liquid phase boundaries. The amphiphilic nature of these agents helps in removing dirt/stains ingrained or bound to surfaces through its lowering of the surface energy interaction between lipophilic-dirt/stains and the aqueous washing solution, so that dirt/stains may be entrapped and dissociated into the washing solution. Lowering the surface tension of the aqueous wash solution enables the dirt/stains, which primarily consist of lipophilic oils and grease, to be captured and suspended into the aqueous wash within the forming emulsion.

Surfactants have various applications and can be used as detergents, dispersants, emulsifiers, wetting agents, coupling agents and for other similar purposes as well, with detergents being the most common use of the surfactants. The detergents in a solution help through solubilizing a variety of chemical species by dissociating bigger aggregates into small particle size by lowering the interfacial energies between the two phases. Achieving a finer particle size is considered an important characteristic of a surfactant-detergent as it enables particle suspensions to last longer and provides more interfacial surface area for a number of potential activities, i.e., taste, reactivity, extraction rates, and transportation.

Surfactants have further applications in several industries including agriculture, food, cosmetics, pharmaceuticals, and petroleum. In the food industry, the surfactants, specifically bio-surfactants, are used to control fat globules aggregation, stabilization of emulsions, improving shelf life of products, and improving texture of fat-based products.

Furthermore, surfactants also play a major role in the petroleum industry and, specifically, in the process of oil recovery. The surfactants are used under the tertiary recovery method in the process of oil recovery. Recovering oil from subsurface reservoirs involves many factors that play a significant role in determining the effectiveness of oil recovery. Such factors include the amount of interfacial tension between brine and residual oil, mobility of the brine, property of the rock surfaces (particularly the wettability feature), and other factors. Often surfactants are used to produce emulsions and adsorb onto the interface between the two phases. Amphiphilic surfactants are particularly preferred in such applications.

Additionally to the above described applications, surfactants play a major role as compatibilizing agents, also termed "coupling agents". Compatibilizing agents are added to a blend of immiscible polymers to increase the stability of the composite mixture. These agents do so by enabling the two immiscible polymers to interact with lower interfacial tensions. The interaction stabilizes the intermatrix system and enhances the system's mechanical properties. The reduction in the size of the phase-separated particles results in the increased stability of the immiscible polymers blend.

Traditional surfactants are comprised of a polar head group and a non-polar tail, possessing a linear mobile amorphous structure, which is depicted in FIGS. 2 and 5.

This arrangement is sufficient for forming micelles and laminar layers in surface adsorption and making emulsions. The type of structure formed is dependent on the surfactant molecular structure, surfactant and matrix chemical properties, temperature, and pH. The majority of common surfactants are linear, which includes everyday surfactants such as sodium dodecyl benzene sulfate, lauryl monoethanol, glycerol diesters, sorbitan monoester, and many others. Traditional linear surfactants possess critical micellar concentrations (CMC) that range from 5 mM to fully soluble in solutions. The CMC is a measure of the concentration at which a surfactant forms micelles, and concentrations above this mark immediately form more micelles. The CMC is used as a characteristic measurement for surfactant properties, informing of its affinity for forming micelles and surface interactions. The lower the surfactant CMC, the more active it is towards functioning as a surface active agent.

Another less traditional linear class of surfactants include Gemini surfactants, which are comprised of two surfactants connected together through a spacer. The surface activation for Gemini surfactants is essentially an extension of the monomer formed of traditional linear surfactants, but the binding of two molecules introduces a constraining effect on the surfactant's ability to arrange into complex structures. Gemini surfactants tend to have lower CMC values as compared to traditional surfactants, and are generally considered superior in terms of surface activity.

As detailed in this disclosure, non-linear surfactants have an improved surface activating characteristic due to their rigid structure and facial area contact. They possess lower solubility and CMC, which spans a large concentration rage. Non-linear surfactants are predisposed for forming dimeric and smaller micellar structures. Their rigid structure forces smaller micelle shapes as they are not freely mobile on the surface like traditional linear surfactants as illustrated in FIGS. 1, 3, 4, and 6. The most notable non-linear surfactants are bile acids, a class of bio-derived sterols that aid in the digestion of fats and vitamins in all mammals. These biological surfactant-detergents have evolved due to the large range of required CMCs to work effectively regardless of diet and food intake, and their propensity to form small emulsion micelles that are able to be adsorbed through intestinal epithelial lining.

In many surface activating uses, it is desirable to have high affinity for surface adsorption and formation of sub-micron micellar structures. This includes, for example, the formation of nanoemulsions, which have higher sweep efficiency in oil-sand separations, and lower volume treatments for surface modifications.

In view of the current state of the prior art of surfactants, there is a need for surfactants that are engineered to have both rigid hydrophobic and hydrophilic groups enabling small sized dispersion particles that can effectively provide flexible functionality in a variety of desired interfacially controlled applications.

SUMMARY OF THE DISCLOSURE

The present disclosure relates to a non-linear surfactant comprising bi-functionalized molecules or particles having both hydrophobic and hydrophilic groups. The non-linear surfactant includes a nanoparticle template of a rigid molecular structure, wherein the nanoparticle comprises a molecule or a particle that is bi-functionalized with both hydrophilic and hydrophobic groups to obtain an amphiphilic nanoparticle. The template nanoparticle can be used as a surfactant, wetting agent, emulsifier, detergent or other surface active agents, or for the preparation of nanoemulsions or dispersions. The non-linear surfactant can offer smaller particle sizes for emulsion suspensions and foams. The surfactant of the present disclosure is engineered to have both rigid hydrophobic and hydrophilic groups enabling small sized dispersion particles that can effectively provide flexible functionality in a variety of desired interfacially controlled applications.

In one non-limiting aspect of the present disclosure, the non-linear surfactant possesses geometric dimensions that are rigid, thereby resulting in planar or three-dimensional structures with two or more interfacial regions. Non-limiting example structures are illustrated in FIGS. 1, 3, and 4. The rigid structure of the non-linear surfactant may be constructed from molecular organic ring structures, such as the steroid or terpene chemical classes, or from inorganic crystal structures like $TiO_2$, SiO, or iron particles. A simple known example of three-dimensional particles with two or more distinct physical properties are called Janus particles. The present disclosure expands on these non-linear surfactant designs and their applicable use in a number of industry surface activating uses.

In another non-limiting aspect of the present disclosure, there is provided a non-linear surfactant comprising a template nanoparticle having a rigid structure.

In another non-limiting aspect of the present disclosure, there is provided a non-linear surfactant comprising multi-functionalized particles with functionality affinities for hydrophobic, hydrophilic, lipophilic, siliphilic, fluorophilic, and other chemical affinities.

In another non-limiting aspect of the present disclosure, there is provided a non-linear surfactant comprising bi-functionalized particles with both hydrophobic and hydrophilic groups.

In another non-limiting aspect of the present disclosure, there is provided a non-linear surfactant comprising a nanoparticle template having either or both organic and inorganic structural rigid non-linear frame.

In another non-limiting aspect of the present disclosure, there is provided a non-linear surfactant that enhances the interfacial interactions among the solution's composition members.

In another non-limiting aspect of the present disclosure, there is provided an amphiphilic non-linear surfactant having surface characteristics that provide increased efficiency by increasing surface activity.

In another non-limiting aspect of the present disclosure, there is provided an amphiphilic non-linear surfactant having surface characteristics that provide increased emulsion efficiency by decreasing the micelle particle size.

In another non-limiting aspect of the present disclosure, there is provided an inorganic rigid particle template for a non-linear surfactant that is obtained from common and naturally abundant metals, metal oxides, ceramics, and mixtures thereof.

In another non-limiting aspect of the present disclosure, there is provided an inorganic rigid particle template for a non-linear surfactant that can be selected from graphene, inorganic oxide nanoparticles, nanofibers, and nanoplatelets.

In another non-limiting aspect of the present disclosure, there is provided a non-linear surfactant comprising amphiphilic particles including, but not limited to, titanium oxide, silica, graphene, and other inorganic particles, fibers, and platelets.

In another non-limiting aspect of the present disclosure, there is provided an organic version of a non-linear rigid surfactant that includes carbon ring systems, such as the sterols and terpenes and, more specifically, bile acids and salts, cholesterol, abietic acid, and their derivatives, which have a planar separation between its hydrophobic and hydrophilic facial regions.

In another non-limiting aspect of the present disclosure, there is provided a rigid particle template for a non-linear surfactant obtained as a by-product of the animal-processing industry, plant-based agricultural processing industry, or petroleum-processing industry.

In another non-limiting aspect of the present disclosure, the particle of the non-linear surfactant of the present disclosure provides for the smaller dispersant size of the surfactant in solutions and the reduced size is 10-100 times (and all values and ranges therebetween) of the general particle size in an emulsion.

In another non-limiting aspect of the present disclosure, the template nanoparticle of the present disclosure is used as a surfactant, wetting agent, compatibilizer, coupling agent, emulsifier, detergent or other surface active agents, or for the preparation of nanoemulsions or dispersions.

In another non-limiting aspect of the present disclosure, the non-linear surfactant of the present disclosure is used in the domain selected from, but not limited to, oil extraction and recovery, environmental remediation, surface cleaning, cosmetic and pharmaceutical formulations, cancer therapy, composite materials, and others.

In another non-limiting aspect of the present disclosure, the non-linear surfactant of the present disclosure comprises a nanoparticle template of a rigid molecular structure wherein the nanoparticle comprises multi-functional molecular regions.

In another non-limiting aspect of the present disclosure, the nanoparticle in the nanoparticle template of the non-linear surfactant includes molecular structures ranging in size from 0.2-1,000 nm (and all values and ranges therebetween).

In another non-limiting aspect of the present disclosure, the nanoparticle template of the non-linear surfactant is composed of a planar or three-dimensional molecular shape that results in fixed domains of multi-functional molecular regions wherein the multi-functionalized nanoparticle has two or more functional properties.

In another non-limiting aspect of the present disclosure, the nanoparticle template of the non-linear surfactant includes two or more of the functional properties of ionic surface charge, hydrophilic, hydrophobic, lipophilic, omniphobic, and omniphilic.

In another non-limiting aspect of the present disclosure, the nanoparticle template of the non-linear surfactant includes one or both of an organic and an inorganic base template structure.

In another non-limiting aspect of the present disclosure, the nanoparticle functional properties in the nanoparticle template of the non-linear surfactant include functional groups that include alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting aspect of the present disclosure, the nanoparticle template of the non-linear surfactant includes an organic ring structure support template that is a derivative of terpenes, terpenoids, sterols, graphenes, and their derivatives thereof, which include the molecular structures of monoterpenoids, sesquiterpenoids, diterpenoids, sesterterpenoids, triterpenoids, tetraterpenoids, polyterpenoids, monoterpenes, sesquiterpenes, diterpenes, sesterpenes, triterpenes, sesquarterpenes, tetraterpenes, polyterpenes, polyaromatic hydrocarbons, bile acids, abietic acid and their derivatives thereof.

In another non-limiting aspect of the present disclosure, the nanoparticle template of the non-linear surfactant includes one or more metals, ceramics, cermets, metalloids, and mixtures thereof, which include but are not limited to iron, aluminium, magnesium, titanium, tungsten, copper, titanium oxides, silicon oxides, iron oxides, aluminium oxides, magnesium oxides, boron oxides, tungsten oxides, tungsten carbide, boron carbide, silicon carbide, titanium carbide, titanium phosphates, silicon phosphates, clays, graphites, and combinations thereof.

In another non-limiting aspect of the present disclosure, the non-linear surfactant of the present disclosure comprises a nanoparticle template of a rigid molecular structure, wherein the nanoparticle of the disclosure comprises a molecule or a particle, bi-functionalized with both hydrophilic and hydrophobic groups, to obtain an amphiphilic nanoparticle, wherein the nanoparticle can be used as a surfactant, wetting agent, emulsifier, detergent, or other surface active agents, or for the preparation of nanoemulsions or dispersions.

In another non-limiting aspect of the present disclosure, the non-linear surfactant of the present disclosure provides the advantages in applications that include a broad range of detergents, propensity for nano-sized micelles, and rigid interfacial interaction between hydrophobic and hydrophilic substituents.

In another non-limiting aspect of the present disclosure, the non-linear surfactant of the present disclosure, when used in a solution, promotes the better interfacial interactions among the solution's composition members.

In another non-limiting aspect of the present disclosure, the non-linear surfactant of the present disclosure provides an improved adsorption, dissolution, mixing, surface modification, and/or compatibilization at concentrations between 0.1 micromolar and 100 molar (and all values and ranges therebetween).

In another non-limiting aspect of the present disclosure, the non-linear surfactant of the present disclosure has varied applications in the domains including, but not limited to, oil and gas recovery, environmental remediation, surface cleaning solutions or agents, cosmetic and pharmaceutical formulations, medical therapies and others.

In another non-limiting aspect of the present disclosure, the non-linear surfactant of the present disclosure can be used in the areas including, but not limited to, reservoir wettability modification, oil viscosity reduction, drilling mud, isoelectric controlled surface absorbers, paraffin/asphalt deposition control, enhanced oil displacement, hydrocarbon dispersion, nanoemulsions, microbial-enhanced oil recovery, soil washing, remediation of oil spills, oil tank/container cleaning, unclogging of bore holes, composite formulations, pharmaceutical formulations, cosmetic formulations, sweetening agents, taste masker, cell targeting, and other similar application areas.

In another non-limiting aspect of the present disclosure, the non-linear surfactant of the present disclosure comprises bi-functionalized molecules and/or particles having both hydrophobic and hydrophilic groups and includes a rigid molecular structure. The molecules and/or particles are bi-functionalized with both hydrophilic and hydrophobic groups to obtain an amphiphilic particle.

In another non-limiting aspect of the present disclosure, the non-linear surfactant of the present disclosure comprises molecules and/or particles and includes an organic ring structure support template of monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid, and their derivatives thereof.

In another non-limiting aspect of the present disclosure, the non-linear surfactant of the present disclosure contains molecules and/or particles ranging in size from 0.2-1,000 nm.

In another non-limiting aspect of the present disclosure, the non-linear surfactant of the present disclosure is composed of a planar or three-dimensional molecular shape that results in fixed domains of multi-functional molecular regions, wherein the multi-functionalized nanoparticle has two or more functional properties.

In another non-limiting aspect of the present disclosure, the non-linear surfactant of the present disclosure comprises two or more of the functional properties of ionic surface charge, hydrophilic, hydrophobic, lipophilic, omniphobic, and omniphilic.

In another non-limiting aspect of the present disclosure, the nanoparticle template to be used in the non-linear surfactant rigid structure is composed of both or either organic and inorganic base template structures.

In another non-limiting aspect of the present disclosure, the non-linear surfactant of the present disclosure includes of functional groups that include alcohols, carboxylic acids, esters, anhydrides, amides, nitriles, aldehydes, boron, thiols, amines, ethers, sulphides, alkenes, alkynes, alkyl halides, nitro, alkyls.

In another non-limiting aspect of the present disclosure, the non-linear surfactant of the present disclosure wherein the non-linear surfactant comprises an organic ring structure support template that is a derivative of terpenes, terpenoids, sterols, graphenes, and their derivatives thereof, which include the molecular structures of monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid and their derivatives thereof.

In another non-limiting aspect of the present disclosure, the non-linear surfactant of the present disclosure is comprised of one or more metals, ceramics, cermets, metalloids, and mixtures thereof, which include but are not limited to iron, aluminium, magnesium, titanium, tungsten, copper, titanium oxides, silicon oxides, iron oxides, aluminium oxides, magnesium oxides, boron oxides, tungsten oxides, tungsten carbide, boron carbide, silicon carbide, titanium carbide, titanium phosphates, silicon phosphates, clays, graphites, and combinations thereof.

In another non-limiting aspect of the present disclosure, the non-linear surfactant of the present disclosure can be used as a surfactant, wetting agent, emulsifier, detergent or other surface-active agents, or for the preparation of nanoemulsions or dispersions.

In another non-limiting aspect of the present disclosure, the non-linear surfactant of the present disclosure can be used in a broad range of detergents, propensity for nano-sized micelles, and rigid interfacial interaction between hydrophobic and hydrophilic substituents.

In another non-limiting aspect of the present disclosure, the non-linear surfactant of the present disclosure can be used in a solution to promote the better interfacial interactions among the solution's composition members.

In another non-limiting aspect of the present disclosure, the non-linear surfactant of the present disclosure provides an improved adsorption, dissolution, mixing, surface modification, and/or compatibilization at concentrations between 0.1 micromolar and 100 molar.

In another non-limiting aspect of the present disclosure, the non-linear surfactant of the present disclosure has varied applications in the domains including, but not limited to oil and gas recovery, environmental remediation, surface cleaning solutions or agents, cosmetic and pharmaceutical formulations, medical therapies and others.

In another non-limiting aspect of the present disclosure, the non-linear surfactant of the present disclosure can be used in the areas including, but not limited to, reservoir wettability modification, oil viscosity reduction, drilling mud, isoelectric controlled surface absorbers, paraffin/asphalt deposition control, enhanced oil displacement, hydrocarbon dispersion, nanoemulsions, microbial-enhanced oil recovery, soil washing, remediation of oil spills, oil tank/container cleaning, unclogging of bore holes, composite formulations, pharmaceutical formulations, cosmetic formulations, sweetening agents, taste masker, cell targeting, and other similar application areas.

In one non-limiting object of the present disclosure, there is the provision of a non-linear surfactant comprising bi-functionalized molecules and/or particles having both hydrophobic and hydrophilic groups.

In another non-limiting object of the present disclosure, there is the provision of a non-linear surfactant that includes a rigid molecular base compound, the base compound bi-functionalized with both hydrophilic and hydrophobic functional groups to obtain an amphiphilic particle.

In another non-limiting object of the present disclosure, there is the provision of a non-linear surfactant wherein the base compound includes an organic and/or an inorganic material.

In another non-limiting object of the present disclosure, there is the provision of a non-linear surfactant wherein the base compound includes an organic material such as an organic ring structure support template of abietic acid, polyaromatic hydrocarbons, steroids, terpenes, squalenes, terpenoids, sterols, graphenes, and their derivatives.

In another non-limiting object of the present disclosure, there is the provision of a non-linear surfactant wherein the base compound includes an organic material such as monoterpenoids, sesquiterpenoids, diterpenoids, sesterterpenoids, triterpenoids, tetraterpenoids, polyterpenoids, monoterpenes, sesquiterpenes, diterpenes, sesterpenes, triterpenes, sesquarterpenes, tetraterpenes, polyterpenes, polyaromatic hydrocarbons, bile acids, abietic acid, and their derivatives thereof.

In another non-limiting object of the present disclosure, there is the provision of a non-linear surfactant wherein the base compound has an average particle size of 0.2 nm to 1,000 nm (and all values and ranges therebetween), and typically 1-500 nm.

In another non-limiting object of the present disclosure, there is the provision of a non-linear surfactant wherein the one or more function groups that are formed on the surface of the base compound form an ionic surface charge, a hydrophilic region, a hydrophobic region, a lipophilic region, an omniphobic region, and/or an omniphilic region.

In another non-limiting object of the present disclosure, there is the provision of a non-linear surfactant wherein the one or more functional groups formed on the surface of the base compound include two or more groups consisting of alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting object of the present disclosure, there is the provision of a non-linear surfactant that is attached to a base particle wherein the base particle includes one or more metals, ceramics, cermets, non-metals, plastics, resins, and/or metalloids.

In another non-limiting object of the present disclosure, there is the provision of a non-linear surfactant that is attached to a base particle wherein the base particle includes iron, aluminium, magnesium, titanium, tungsten, copper, titanium oxides, silicon oxides, iron oxides, aluminium oxides, magnesium oxides, boron oxides, tungsten oxides, tungsten carbide, boron carbide, silicon carbide, titanium carbide, titanium phosphates, silicon phosphates, clays, graphites, and combinations thereof.

In another non-limiting object of the present disclosure, there is the provision of a non-linear surfactant that is attached to a base particle, and wherein the base particle has an average particle size of 1 nm to 1 cm (and all values and ranges therebetween), and typically 10 nm to 0.1 cm.

In another non-limiting object of the present disclosure, there is the provision of a non-linear surfactant that can be used as a surfactant, wetting agent, emulsifier, detergent or other surface active agents, or for the preparation of nanoemulsions or dispersions.

In another non-limiting object of the present disclosure, there is the provision of a non-linear surfactant that can improve detergents, improve propensity for nano-sized micelles, and improve interfacial interaction between hydrophobic and hydrophilic substituents.

In another non-limiting object of the present disclosure, there is the provision of a non-linear surfactant that can be used in a solution to promote better interfacial interactions among the solution's composition members.

In another non-limiting object of the present disclosure, there is the provision of a non-linear surfactant that can provide an improved adsorption, dissolution, mixing, surface modification, and/or compatibilization at concentrations between 0.1 micromolar and 100 molar (and all values ad ranges therebetween).

In another non-limiting object of the present disclosure, there is the provision of a non-linear surfactant that can used in various applications including oil and gas recovery, environmental remediation, surface cleaning solutions or agents, cosmetic and pharmaceutical formulations, medical therapies and others.

In another non-limiting object of the present disclosure, there is the provision of a non-linear surfactant that can be used in reservoir wettability modification, oil viscosity reduction, drilling mud, isoelectric controlled surface absorbers, paraffin/asphalt deposition control, enhanced oil displacement, hydrocarbon dispersion, nanoemulsions, microbial-enhanced oil recovery, soil washing, remediation of oil spills, oil tank/container cleaning, unclogging of bore holes, composite formulations, pharmaceutical formulations, cosmetic formulations, sweetening agents, taste masker, cell targeting, and other similar application areas.

In another non-limiting object of the present disclosure, there is the provision of a method for forming a non-linear surfactant comprising a) providing a base compound, and b) reacting the base compound with an oxidative reagent.

In another non-limiting object of the present disclosure, there is the provision of a method for forming a non-linear surfactant comprising a) providing a base compound, and b) reacting the base compound with an oxidative reagent, wherein the base compound includes a compound selected from the group consisting of abietic acid, polyaromatic hydrocarbons, steroids, terpenes, squalenes, terpenoids, sterols, graphenes and their derivatives, and wherein the oxidative reagent includes a reagent selected from the group consisting of ozone, $KMnO_4$, $H_2CrO_4$, pyridinium chlorochromate, and peroxides to form a plurality of functional groups on the base compound, the functional groups including one or more groups selected from alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting object of the present disclosure, there is the provision of a method for forming a non-linear surfactant comprising a) providing a base compound, and b) reacting the base compound with an oxidative reagent, wherein the base compound includes a compound selected from the group consisting of monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid, and their derivatives thereof.

In another non-limiting object of the present disclosure, there is the provision of a method for forming a non-linear surfactant comprising a) providing a base compound, and b) reacting the base compound with an oxidative reagent, wherein the base compound has an average particle size of 0.2-1,000 nm (and all values and ranges therebetween).

In another non-limiting object of the present disclosure, there is the provision of a method for forming a non-linear surfactant comprising a) providing a base compound, and b) reacting the base compound with an oxidative reagent, wherein the non-linear surfactant includes 50-99.9999 wt. % base compound (and all values and ranges therebetween) and 0.0001-50 wt. % functional groups (and all values and ranges therebetween).

In another non-limiting object of the present disclosure, there is the provision of a method for forming a non-linear surfactant comprising a) providing a base compound, b) forming a mixture of the base compound, hydrophilic liquid and hydrophobic liquid, and c) adding an oxidative reagent to the mixture to cause the functional groups to form on the base compound.

In another non-limiting object of the present disclosure, there is the provision of a method for forming a non-linear surfactant such as 3α,7α,12α-trihydroxy-5β-cholan-24-oic acid, abieta-7,8,13,14-tetrahydroxy-18-oic-acid, abieta-7-ene-13,14dihydroxy-18-oic-acid, cholic acid, chenodeoxycholic acid, and other non-linear molecular surfactants.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles, wherein the particles are formed of metal, ceramic, cermet, graphite, plastic, resins, or metalloids, and wherein the non-linear surfactant is formed of a base compound with one or more functional groups.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles, wherein the particles are formed of metal, ceramic, cermet, graphite, plastic, resins, or metalloids, and wherein the non-linear surfactant is formed of a base compound with one or more functional groups, and wherein the base compound includes a compound selected from the group consisting of abietic acid, polyaromatic hydrocarbons, steroids, terpenes, squalenes, terpenoids, sterols, graphenes and their derivatives, and wherein the one or more functional groups are selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles such that 30-100% (and all values and ranges therebetween) includes the non-linear surfactant.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles, and wherein an average particle size of the particles is 1 nm to 1 cm.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles and wherein the non-linear surfactant constitutes 0.0000001-10 wt. % (and all values and ranges therebetween) of the modified particle.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles and wherein the non-linear surfactant is formed of a base compound with one or more functional groups, and wherein the base compound includes a compound selected from the group consisting of abietic acid, polyaromatic hydrocarbons, steroids, terpenes, squalenes, terpenoids, sterols, graphenes and their derivatives, and wherein the one or more functional groups are selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles and wherein the non-linear surfactant is formed of a base compound with one or more functional groups, and wherein the base compound includes a compound selected from the group consisting of monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid, and their derivatives thereof.

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles and wherein the non-linear surfactant is formed of a base compound with one or more functional groups, and wherein the base compound has an average particle size of 0.2-1,000 nm (and all values and ranges therebetween).

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles and wherein the non-linear surfactant is formed of a base compound with one or more functional groups, and wherein the non-linear surfactant includes 50-99.9999 wt. % base compound (and all values and ranges therebetween) and 0.0001-50 wt. % function groups (and all values and ranges therebetween).

In another non-limiting object of the present disclosure, there is the provision of a method for forming modified particles that includes a surfactant comprising a) providing particles, b) providing a non-linear surfactant, and c) causing the non-linear surfactant to attach to a surface of a plurality of the particles and wherein the non-linear surfactant includes $3\alpha,7\alpha,12\alpha$-trihydroxy-$5\beta$-cholan-24-oic acid, abieta-7,8,13,14-tetrahydroxy-18-oic-acid, abieta-7-ene-13,14dihydroxy-18-oic-acid, cholic acid, chenodeoxycholic acid, and other non-linear molecular surfactants.

In another non-limiting object of the present disclosure, there is the provision of a reinforced plastic material comprising plastic resin, reinforcement material, and a non-linear surfactant.

In another non-limiting object of the present disclosure, there is the provision of a reinforced plastic material comprising plastic resin, reinforcement material, and a non-linear surfactant, and wherein the non-linear surfactant constitutes about 0.001-5 wt. % of the mixture (and all values and ranges therebetween), the plastic resin constitutes 35-99.989 wt. % of the mixture (and all values and ranges therebetween), and the reinforcement material constitutes 0.01-60 wt. % of the mixture (and all values and ranges therebetween).

In another non-limiting object of the present disclosure, there is the provision of a reinforced plastic material comprising plastic resin, reinforcement material, and a non-linear surfactant, and wherein the non-linear surfactant constitutes about 0.01-2 wt. % of the mixture, the plastic resin constitutes 50.01-99.89 wt. % of the mixture, and the reinforcement material constitutes 0.1-49 wt. % of the mixture.

In another non-limiting object of the present disclosure, there is the provision of a reinforced plastic material comprising plastic resin, reinforcement material, and a non-linear surfactant, and wherein the non-linear surfactant constitutes about 0.05-1 wt. % of the mixture, the plastic resin constitutes 50.01-98.95 wt. % of the mixture, and the reinforcement material constitutes 1-49 wt. % of the mixture.

In another non-limiting object of the present disclosure, there is the provision of a reinforced plastic material comprising plastic resin, reinforcement material, and a non-linear surfactant, and wherein a) the reinforcement material includes hydrophilic fibers and the plastic resin is a hydrophobic plastic resin, or b) the reinforcement material includes hydrophobic fibers and the plastic resin is a hydrophilic plastic resin.

In another non-limiting object of the present disclosure, there is the provision of a reinforced plastic material comprising plastic resin, reinforcement material, and a non-linear surfactant, and wherein the non-linear surfactant is formed of a base compound with one or more functional groups.

In another non-limiting object of the present disclosure, there is the provision of a reinforced plastic material comprising plastic resin, reinforcement material, and a non-linear surfactant, and wherein the non-linear surfactant is formed of a base compound with one or more functional groups, and wherein the base compound includes a compound selected from the group consisting of abietic acid, polyaromatic hydrocarbons, steroids, terpenes, squalenes, terpenoids, sterols, graphenes and their derivatives, and wherein the one or more functional groups including a functional group selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting object of the present disclosure, there is the provision of a reinforced plastic material comprising plastic resin, reinforcement material, and a non-linear surfactant, and wherein the non-linear surfactant is formed of a base compound with one or more functional groups, and wherein the base compound includes monoterpenoids, sesquiterpenoids, diterpenoids, sesterterpenoids, triterpenoids, tetraterpenoids, polyterpenoids, monoterpenes, sesquiterpenes, diterpenes, sesterterpenes, triterpenes, sesquarterpenes, tetraterpenes, polyterpenes, polyaromatic hydrocarbons, bile acids, abietic acid, and their derivatives thereof.

In another non-limiting object of the present disclosure, there is the provision of a reinforced plastic material comprising plastic resin, reinforcement material, and a non-linear surfactant, and wherein the non-linear surfactant is formed of a base compound with one or more functional groups, and wherein the base compound has an average particle size of 0.2-1,000 nm (and all values and ranges therebetween).

In another non-limiting object of the present disclosure, there is the provision of a reinforced plastic material comprising plastic resin, reinforcement material, and a non-linear surfactant, and wherein the non-linear surfactant is formed of a base compound with one or more functional groups, and wherein the non-linear surfactant includes 50-99.9999 wt. % base compound (and all values and ranges therebetween) and 0.0001-50 wt. % function groups (and all values and ranges therebetween).

In another non-limiting object of the present disclosure, there is the provision of a reinforced plastic material comprising plastic resin, reinforcement material, and a non-linear surfactant, and wherein the non-linear surfactant is formed of a base compound with one or more functional groups, and wherein the non-linear surfactant includes 3α,7α,12α-trihydroxy-5β-cholan-24-oic acid, abieta-7,8,13,14-tetrahydroxy-18-oic-acid, abieta-7-ene-13,14dihydroxy-18-oic-acid, cholic acid, chenodeoxycholic acid, and other non-linear molecular surfactants.

In another non-limiting object of the present disclosure, there is the provision of a reinforced plastic material comprising plastic resin, reinforcement material, and a non-linear surfactant, and wherein the resin includes polyester resin, epoxy resin, polyurethane resin, and silicone resin.

In another non-limiting object of the present disclosure, there is the provision of a reinforced plastic material comprising plastic resin, reinforcement material, and a non-linear surfactant, and wherein the resin includes polyolefin plastic resin.

In another non-limiting object of the present disclosure, there is the provision of a reinforced plastic material comprising plastic resin, reinforcement material, and a non-linear surfactant, and wherein the reinforcement material includes carbon fibers, glass fibers, cellulose fibers, and/or polymer fibers.

In another non-limiting object of the present disclosure, there is the provision of a reinforced plastic material comprising plastic resin, reinforcement material, and a non-linear surfactant, and wherein the reinforced plastic material has an increased impact strength of at least 5% as compared to a reinforced plastic material having the same composition except is absent the non-linear surfactant.

In another non-limiting object of the present disclosure, there is the provision of a reinforced plastic material comprising plastic resin, reinforcement material, and a non-linear surfactant, and wherein the reinforced plastic material has an increased impact strength of 5-35% (and all values and ranges therebetween) as compared to a reinforced plastic material having the same composition except is absent the non-linear surfactant.

In another non-limiting object of the present disclosure, there is the provision of a reinforced plastic material comprising plastic resin, reinforcement material, and a non-linear surfactant, and wherein the reinforced plastic material has an increased flexural modulus and strength of at least 2% as compared to a reinforced plastic material having the same composition except is absent the non-linear surfactant.

In another non-limiting object of the present disclosure, there is the provision of a reinforced plastic material comprising plastic resin, reinforcement material, and a non-linear surfactant, and wherein the reinforced plastic material has an increased flexural modulus and strength of 2-20% (and all values and ranges therebetween) as compared to a reinforced plastic material having the same composition except is absent the non-linear surfactant.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the non-linear surfactant constitutes about 0.001-5 wt. % of the mixture (and all values and ranges therebetween), the plastic resin constitutes 35-99.989 wt. % of the mixture (and all values and ranges therebetween), and the reinforcement material constitutes 0.01-60 wt. % of the mixture (and all values and ranges therebetween).

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein i) the reinforcement material includes hydrophilic fibers and the plastic resin is a hydrophobic plastic resin, or ii) the reinforcement material includes hydrophobic fibers and the plastic resin is a hydrophilic plastic resin.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the non-linear surfactant is formed of a base compound with one or more functional groups, and wherein the base compound includes a compound selected from the group consisting of abietic acid, polyaromatic hydrocarbons, steroids, terpenes, squalenes, terpenoids, sterols, graphenes and their derivatives, and wherein the one or more functional groups include one or more functional groups selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the non-linear surfactant is formed of a base compound with one or more functional groups, and wherein the base compound includes a compound selected from the group consisting of monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid, and their derivatives thereof.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the non-linear surfactant is formed of a base compound with one or more functional groups, and wherein the base compound has an average particle size of 0.2-1,000 nm (and all values and ranges therebetween).

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the non-linear surfactant includes 50-99.9999 wt. % base compound and 0.0001-50 wt. % functional groups.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the non-linear surfactant includes $3\alpha,7\alpha,12\alpha$-trihydroxy-$5\beta$-cholan-24-oic acid, abieta-7,8,13,14-tetrahydroxy-18-oic-acid, abieta-7-ene-13,14dihydroxy-18-oic-acid, cholic acid, chenodeoxycholic acid, and other non-linear molecular surfactants.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the resin includes polyester resin, epoxy resin, polyurethane resin, and silicone resin.

In another non-limiting object of the present disclosure, there is the provision of a method of forming a reinforced plastic material comprising a) providing a plastic resin; b) providing a reinforcement material; c) mixing the plastic resin, reinforcement material and a non-linear surfactant to form a mixture; and, d) curing, setting and/or drying the plastic resin in the mixture to form the reinforced plastic material, and wherein the reinforcement material includes carbon fibers, glass fibers, cellulose fibers, and/or polymer fibers.

In another non-limiting object of the present disclosure, there is the provision an emulsion comprising a non-linear surfactant, water and particles.

In another non-limiting object of the present disclosure, there is the provision of an emulsion comprising a non-linear surfactant, water, and particles, and wherein the particles are suspended in the emulsion having an average particle size of less than 0.1 micron, the particles constitute about 1-50 wt. % of the emulsion (and all values and ranges therebetween), the non-linear surfactant constitutes about 0.001-5 wt. % of the emulsion (and all values and ranges therebetween), the water constitutes 45-98.999 wt. % of the emulsion (and all values and ranges therebetween).

In another non-limiting object of the present disclosure, there is the provision of an emulsion comprising a non-linear surfactant, water, and particles, and wherein the particles are resin particles and/or organic particles.

In another non-limiting object of the present disclosure, there is the provision of an emulsion comprising a non-linear surfactant, water, and particles, and wherein the non-linear surfactant is formed of a base compound with one or more functional groups, and wherein the base compound including a compound selected from the group consisting of abietic acid, polyaromatic hydrocarbons, steroids, terpenes, squalenes, terpenoids, sterols, graphenes and their derivatives, and wherein the one or more functional groups including a group selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls.

In another non-limiting object of the present disclosure, there is the provision of an emulsion comprising a non-linear surfactant, waters and particles, and wherein the base compound includes a compound selected from the group consisting of monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid, and their derivatives thereof.

In another non-limiting object of the present disclosure, there is the provision of an emulsion comprising a non-linear surfactant, water, and particles, and wherein the base compound has an average particle size of 0.2-1,000 nm (and all values and ranges therebetween).

In another non-limiting object of the present disclosure, there is the provision of an emulsion comprising a non-linear surfactant, water, and particles, and wherein the non-linear surfactant includes 50-99.9999 wt. % base compound (and all values and ranges therebetween) and 0.0001-50 wt. % functional groups (and all values and ranges therebetween).

In another non-limiting object of the present disclosure, there is the provision of an emulsion comprising a non-linear surfactant, water, and particles, and wherein the non-linear surfactant includes 3α,7α,12α-trihydroxy-5β-cholan-24-oic acid, abieta-7,8,13,14-tetrahydroxy-18-oic-acid, abieta-7-ene-13,14dihydroxy-18-oic-acid, cholic acid, chenodeoxycholic acid, and other non-linear molecular surfactants.

In another non-limiting object of the present disclosure, there is the provision of an emulsion comprising a non-linear surfactant, water, and particles, and wherein the particles include particles of polyester resin, epoxy resin, polyurethane resin, and/or silicone resin.

In another non-limiting object of the present disclosure, there is the provision of an emulsion comprising a non-linear surfactant, water, and particles, and wherein the emulsion is used to form porous and solid sand beds in a subterranean structure.

In another non-limiting object of the present disclosure, there is the provision of an emulsion comprising a non-linear surfactant, water, and particles, and wherein the emulsion is used to improve detergents, improve propensity for nano-sized micelles, and improve interfacial interaction between hydrophobic and hydrophilic substituents.

In another non-limiting object of the present disclosure, there is the provision of an emulsion comprising a non-linear surfactant, water, and particles, and wherein the emulsion is used to promote the better interfacial interactions among the solution's composition members.

In another non-limiting object of the present disclosure, there is the provision of an emulsion comprising a non-linear surfactant, water, and particles, and wherein the emulsion is used to improve adsorption, dissolution, mixing, surface modification, and/or compatibilization.

In another non-limiting object of the present disclosure, there is the provision of an emulsion comprising a non-linear surfactant, water, and particles, and wherein the emulsion is used in various applications including oil and gas recovery, environmental remediation, surface cleaning solutions or agents, cosmetic and pharmaceutical formulations, medical therapies and others.

In another non-limiting object of the present disclosure, there is the provision of an emulsion comprising a non-linear surfactant, water, and particles, and wherein the emulsion is used in reservoir wettability modification, oil viscosity reduction, drilling mud, isoelectric controlled surface absorbers, paraffin/asphalt deposition control, enhanced oil displacement, hydrocarbon dispersion, nanoemulsions, microbial-enhanced oil recovery, soil washing, remediation of oil spills, oil tank/container cleaning, unclogging of bore holes, composite formulations, pharmaceutical formulations, cosmetic formulations, sweetening agents, taste masker, cell targeting, and other similar application areas.

Other aspects, advantages, and novel features of the present disclosure will become apparent from the following detailed description of the disclosure when considered in conjunction with the accompanying drawings.

DETAILED DESCRIPTION OF NON-LIMITING EMBODIMENTS

Figure 1:
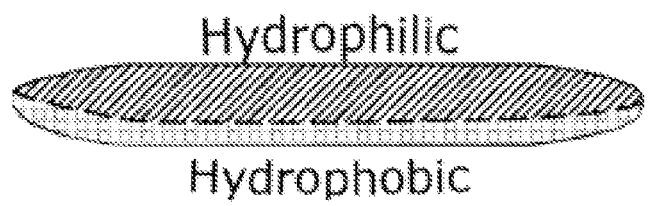
FIG. 1 depicts a three-dimensional template structure shape (a platelet) that possesses two different functional regions (a hydrophobic half and a hydrophilic half) which can also be considered facial regions in accordance with the present disclosure. The non-linear surfactant has been surface modified such that hydrophilic functional groups are located on the top surface of the base compound or particle and hydrophobic functional groups are located on the bottom surface of the base compound or particle. As can be appreciated, the non-linear surfactant can be surface modified such that hydrophobic functional groups are located on the bottom surface of the base compound or particle and hydrophilic functional groups are located on the top surface of the base compound or particle.
Figure 2:
FIG. 2 depicts a traditional linear prior art surfactant. It has an end that is hydrophilic and an end that is hydrophobic. Both ends are free for molecular movement independent of one another.
Figure 3:
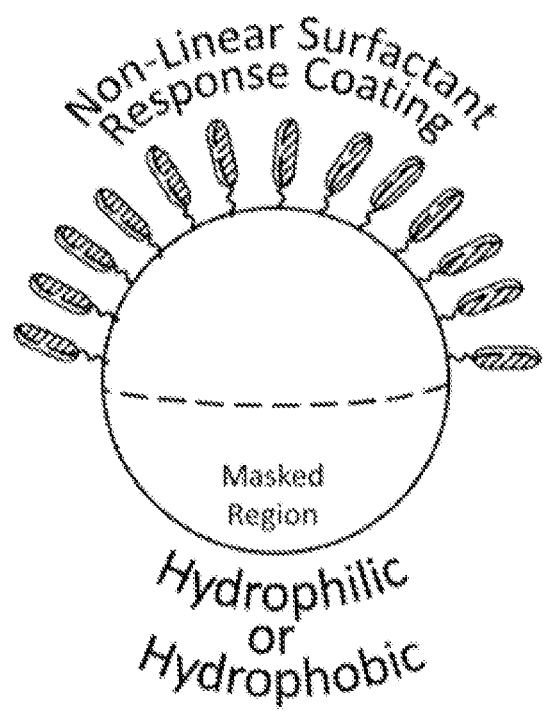
FIG. 3 depicts a three-dimensional template structure shape (a sphere; however, other shapes can exist) that possesses two different functional regions, one being a response coating of a non-linear surfactant, which can also be considered facial regions. The bottom portion of the particle has been masked (typically by use of a coating), to prevent the non-linear surfactant from attaching to the bottom portion of the particle. As such, only the top portion of the particle is illustrated as having non-linear surfactant attached to the particle.
Figure 4:
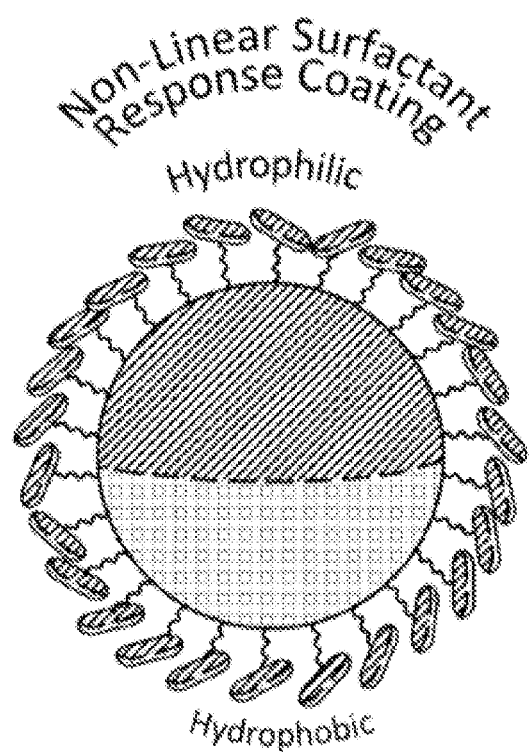
FIG. 4 depicts another three-dimensional template structure shape (a sphere; however, other shapes can exist) that possesses a full coating of non-linear molecular surfactants, which in response to a bi-phase interface form two different functional regions, one being a response exposing a hydrophobic facial region, and the other a response exposing hydrophilic facial region. The bottom portion of the particle has non-linear surfactant attached to the bottom portion of the particle that include hydrophobic functional groups, and the top portion of the particle as has non-linear surfactant attached to the top portion of the particle that include hydrophilic functional groups. As can be appreciated, the bottom portion of the particle can have non-linear surfactant attached to the bottom portion of the particle that include hydrophilic functional groups, and the top portion of the particle can have non-linear surfactant attached to the top portion of the particle that include hydrophobic functional groups.
Figure 5:
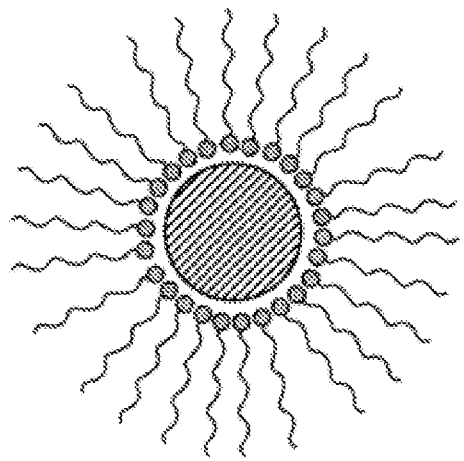
FIG. 5 depicts a traditional prior art surfactant forming micelles around a high surface energy particle.
Figure 6:
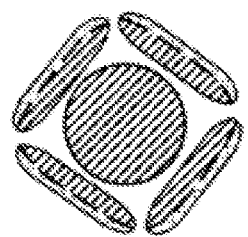
FIG. 6 depicts a non-linear platelet surfactant forming a rigid micelle structure around a high surface energy particle in accordance with the present disclosure.

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one representation of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient, but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

With reference to the present disclosure, the non-linear surfactant described in the disclosure below has applications in varied domains including, but not limited to, recovering oils, environmental remediation, surface cleaning agents, cosmetic formulations, composite materials, and others.

In one non-limiting embodiment of the disclosure is the design of non-linear surfactants and their engineered production. The construction of these amphiphilic structures can be achieved through a number of surface modification processes. Methods for producing region-controlled surface modification for non-linear surfactants for applications in markets of material composites, oil and gas enhanced oil recovery, emulsion and dispersions, pharmaceutical, cosmetic, water and chemical purification are briefly described. Those skilled in the field of surface modification engineering can discern processing methods from traditional chemistry and surface modification.

The non-linear surfactants of the present disclosure are a unique class of surface activating agents in that their amphiphilic structure is a rigid three-dimensional shape. The rigid amphiphilic surface facial parts act as platelet or particle couplers at the interfacial phase boundary with improved affinity. Non-linear surfactants have improved affinity, lower solubilities, and critical micellar concentration that are broad across a large concentration range. Traditional surfactants' molecular amphiphilicity is freely mobile to contort, which promotes higher solution solubilities and propensity to form larger micelle or bilayer membranes between phases. Having low solubilities and a higher phase boundary affinity makes non-linear surfactants a desirable surfactant choice in numerous industry applications that desire surface activity at lower concentrations and reduced particle emulsion sizes.

In another embodiment of the disclosure, the non-linear surfactants that are used to enhance oil recovery include a nanoparticle with rigid amphiphilic regions that possess specific isoelectric points controlled by pH. The specific isoelectric points of the molecule will be different than that of the well's formation rock's isoelectric point. By adjusting the pH, the charged faces of the non-linear surfactant and rock face can be controlled to promote the surfactant to permeate through the hydrophilic and hydrophobic barriers to the rock face and finally controlled for adsorption to the rock face. Surface modification of the conductive formation rock face to oleophilic or fluorophilic affinity reduces surface energies and friction of moving and flowing recovery petroleum fluids.

The non-linear surfactants are comprised of molecular framework structures ranging in size from 0.2-10,000 nm (and all values and ranges therebetween), and typically 0.5-1,000 nm. Non-linear surfactants possess planar or three-dimensional amphiphilic structural regions comprised of two or more functionalities.

The non-linear surfactants are comprised of molecules or particles that have one or more similar functional groups characterized by similar affinity for lipophilicity or hydrophilicity or halophilicity or siliphilicity or hydrophobicity that reside on a plane, of which that plane does not cross or intercede with the molecule's or particle's opposing functional group plane. Opposing functional groups are those with different affinity, such as hydrophilic groups have opposing affinity to lipophilic (hydrophobic), siliphilic, halophilic, in a non-limiting example of opposing functional group affinities.

The non-linear surfactant's amphiphilic functional group regions should be rigid and intramolecularly respond to molecular movement or translation in a restricted response motion, and maintain region affinity plane restrictions previously described.

Those skilled in the chemical arts will be able to discern functional groups' appropriate affinity. A non-limiting example of functional group affinities include: hydrophilic functional groups—hydroxyl, alcohols, thiols, amines, carboxylic acids, ketones, aldehydes, amides, esters, methoxy peroxides, imides, imines, cyanates, nitrates, oximes, sulfoxides, sulfones, and similar nitrogen, oxygen, sulfur functional groups; lipophilic functional groups—methyl, ethyl, propyl, butyl, pentyl, oligio-hydrocarbons, alkenes, alkyls, alkynes, cyclohydrocarbons, benzene rings, fluorocarbons; siliphilic functional groups—silicone, silenes, silanes; and halophilic functional groups—fluoroalkanes, chloroalkanes, bromoalkanes.

The molecular frameworks should be rigid, possess planar or three-dimensional structure, and be comprised of inorganic or organic material or combinations of both. Inorganic molecular frameworks may be comprises of planar structures that include, but are not limited to, graphene, graphyne, borophene, germanene, silicone, phosphorene, bismuthene, SiC, $SiC_2$, zinc oxides, carbonitrides, single-layer coordination polymers, and particles in the form of spheres, flakes, ribbons, irregular, pyramidal, cubic, diamond, or other simple or complex geometric shapes. Particle compositions may be comprised of one or more inorganic materials that include, but are not limited to, metals, transition metals, metal oxides, ceramics, titanium oxides, silicon oxides, iron oxides, gold, silver, copper, aluminium, boron complexes, boronitrieds, borocarbonitrides, molybdenum disulphide, molybdenum oxides, vanadium oxides, zinc oxides, metal carbides, carbonitrides, $B_2C$, SiC, $SiC_2$, $BSi_3$, and mixtures thereof. These structures may be produced through generally known particle generating methods that include, but are not limited to, synthetic generation, precipitations, milling, sonication, and cryogenic fracturing. Those skilled in the art of materials and particles production will be able to generate molecular structures and core framework structures. Organic molecular frameworks similarly may possess planar or three-dimensional forms. In one non-limiting configuration, these organic molecular frameworks are made of ring structures.

The non-linear organic frames with cyclic ring structures may be obtained from biological and natural resources, such as the sterols, terpenes, cyclic hydrocarbon petroleum by-products, and phytosterols from agricultural collection or other synthetic production from natural and/or abundant resources such as abietic acid, cholic acid, deoxycholic acid, lithocholic acid, cholesterol, chenodeoxycholic acid, and other specific molecular carbon ring structure molecules that have modifiable rigid cyclic-planar or three-dimensional structures. The non-linear organic frames can also include the molecular structures of monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, and their derivatives thereof.

Controlled region-modification of the molecular frameworks' facile regions can be completed through covalent bonding or mechanical means. Non-limiting examples include immobilized particle surface modification for single side directed modification that includes chemical or mechanical alterations, and region- and stereo-controlled synthetic modifications. Immobilization of particles is designed to limit exposed surface area to a partial portion for modification, which is completed by mechanical removal to an alternative exposed layer or chemical alteration. Immobilization of particles may be completed by methods of electrostatic and adhesive adsorption, embedment into melt or plastic stage, embedment into solid melt emulsion particles, bi-phase interfacial emulsion, or combinations thereof. Immobilized partially exposed particle surfaces may then be modified by these non-limiting examples: mechanical friction ware or chemical alterations through reactions that include oxidative, reductive, addition, substitution, hydroxylation, metalization, acylation, esterification, nucleophilic addition, nitrosylation, cyanation, amidation, CH functionalization, carbonylation, hydrocarboxylation, ammoxidation, allylation, nucleophilic substitution, acid hydrolysis, free radical addition, halide addition/substitution, elimination, electrophilic addition, oxidative addition, reductive elimination, oxidative coupling, and combinations thereof. Chemical modifications may be performed through these non-limiting examples plasma surface modification, applied coatings, chemical vapour deposition, electroplating, solution/wet chemistry, and combinations thereof.

In one non-limiting embodiment, there is provided a biphase interface modification, including amphiphilic generation that is performed in situ within the emulsion. The molecule or particle surface can be partially modified in emulsion systems with reactants localized to a desired phase. The non-linear frame/scaffold is dispersed into a favorable medium to which the opposing immiscible medium is added with reactants for imparting favorable affinity. Non-linear frame surfaces that come into contact at the emulsion interface will be region-modified to the desired affinity and be held in-between the emulsion phases.

For immobilizing particle scaffolds for region-surface modification, a solid with a low melting point can be used at a temperature above the melting point to form an emulsion. The emulsion can be sized to form droplets to partially adsorb the non-linear particle scaffold/frame that are cooled to solidify, immobilize and cover partial particle surface regions, so that collected immobilized non-linear surfactant particles may be modified in low temperature reactions, such as solution/wet chemistry or chemical vapour deposition.

The non-linear surfactant manufacturing can be regio- and stereo-controlled synthetic modifications to rigid molecular frameworks. Various types of classes of functional groups are able to be attached to particle or molecular surfaces for modification to desired chemical characteristics—producing different functional group couplings. For example, acid hydrolysis with $HNO_3$ or mixture with $H_2SO_4$ modifies the surfaces to be more hydrophilic, with hydroxyl or carboxylate adduct products. Non-limiting examples of region- and stereo-controlled reactions include electrogenerated radicles, hydrogenation, oxidation or reduction, nucleophilic substitution, nucleophilic addition, esterification, nitrosylation, cyanation, amidation, CH functionalization, carbonylation, hydrocarbonylation, ammoxidation, allyation, haloation, free-radical addition, electrophilic addition, oxidative coupling, 4+4 photocycloaddition, 6+4 cycloaddition, 4+3 cycloaddition, hydroboration, enolate alkylation, epoxidation, and combinations thereof. In one non-limiting configuration, region modification of organic molecular planar structures is used to selectively generate bifunctional facial sides from unsaturated and saturated carbon ring systems. Modification-synthetic methods include hydroxylation of alkenes, syn-alkene modification, pseudo-equatorial aldol reactions and enolate-alkylations. Non-limiting examples of chemical modification methods for region modification of alkenes includes epoxidation with back side hydrophobic nucleophiles, oxymercuration-demercuration, alkoxymercuration-demercuration, hydroboration, carbine addition, dihydroxylation by peroxides, dihydroxylation by osmium tetraoxide, dihydroxylation by permanganate, and similar modifications to methods thereof.

The modifications can include any number of these chemical or mechanical methods in any number or order of methods. The listed methods do not serve as an exhaustive limiting list, but for a general description of practiced methods for those not skilled in the art of chemistry. Those that are skilled will see the general embodying methods for capability to region-specifically modify rigid template particles and molecules for non-linear surfactant designs.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

EXAMPLES

These examples describe non-limiting embodiments of the present disclosure and detail their design and use.

In an example embodiment of the present disclosure, a planar surfactant 3α,7α,12α-trihydroxy-5β-cholan-24-oic acid was used in the interfacial compatibilization between hydrophilic cellulose fibers and hydrophobic polyolefin plastic resin. A 0.125 weight percent addition of the planar surfactant to the composition enhanced compounding of the immiscible reinforcing cellulose filler and plastic, resulting in a 27.5% increase in impact strength. (12.13 ft lbs/in$^2$→15.47 ft lbs/in$^2$), and an approximate 4% increase in flexural modulus and strength (0.84 GPa→0.87 GPa modulus; 19.6 MPa→20.5 MPa strength). Loadings in these types of compounding applications can range from 0.001-50 wt. % (and all values and ranges therebetween). Comparatively, for similar compounding additives, traditional surfactants are needed in twice to five times the amount.

In an example embodiment of platelet surfactants application in emulsion suspensions, 3α,7α,12α-trihydroxy-5β-cholan-24-oic acid was used at 71 mM concentration in a 23 wt. % solids solution suspension of bisphenol A/epichlorohydrin-derived liquid epoxy resin, producing a nanoemulsion with a particle size dispersion of a $D_{50}$: 450 nm. The suspension was maintained for up to 1 month unchanged. A comparative emulsion with traditional surfactants had a particle size dispersion of $D_{50}$: 1.43 µm. The resulting platelet surfactant nanoemulsion has a doubly improved pumping efficiency for penetrating through tight sand packs than a traditional surfactant emulsion-depositing uniformly and at twice the distance.

An example of an isoelectric non-linear molecular surfactant is a modified rigid ring structure with a zwitterionic to control solubility and surface activity. Molecular surfactant is defined as a group of atoms bonded together, representing the smallest fundamental unit of a chemical compound. In one non-limiting descriptive example, cholic acid is bound to a zwitterionic bi-functional compound, such as threonine. One (1) equivalent of cholic acid is suspended in an aprotic polar solvent, tetrahydrofuran with the addition of a base catalysis, pyridine. The primed rigid ring moiety structure is titrated with one (1) to three (3) equivalents of a zwitterionic coupling agent, and/or silane threonine, in an aprotic polar solvent. Purified product has applications in surface modification chemistry across materials and production markets. One non-limiting identified application is the oil and gas industry's unconventional resource collections through improving production recovery by controlling the rock wettability and reducing the translation motion energy through rock porosity and fractures. The zwitterionic nature of the isoelectric non-linear molecular surfactant enables the production recovery increase by allowing the production team to control when the surfactant becomes insoluble and favors surface adsorption to the formation's porous and fracture surface. The threonine bound zwitterionic bi-functional compound allows for solubility of the surfactant into pumping solutions controlled to a pH below 5.5, and triggered to adsorb to the rock face when the pH is changed to 5.6.

The example presented above is non-limiting to the example's materials and reagents. Chemical materials described are a general term for the class of materials that fit the chemical category. A non-limiting example of rigid ring-structured molecules includes cholic acid, chenodeoxycholic acid, bile acids, cholesterol, terpenoids, steroids, polycyclic aromatics, etc. and all their derivatives. A non-limiting example of zwitterionic bi-functional compounds include serine, arginine, threonine, tyrosine, glutamine, asparagine, glutamic acid, etc. and all their derivatives. A non-limiting example of organic bases include pyridine, methylamine, imidazole, histidine, guanidine, etc. A non-limiting example of nonpolar aprotic solvents includes tetrahydrofuran, acetone, dimethylformamide, acetonitrile, dimethyl sulfoxide, etc.

This example demonstrates the embodiment of modifying non-linear surfactants for isoelectric point solubility control. Cholic acid is modified by having threonine attached to its C24 functional pendant group. This modification imparts the amino acid's isoelectric point and will enable control for where and when the non-linear surfactant cholic acid adheres or forms critical micellization aggregates. Products of this example can be used in the oil and gas industry as an additive to improve sweet efficiency. The non-linear surfactant with engineered isoelectric point can be transported down to a subterranean formation at a soluble pH and then, when triggered by a pH change to the compound's pI, becomes less soluble and adsorbs onto the formation rock surface; thus promoting lower surface interfacial energies due to the amphiphilic mature of the non-linear surfactant.

Another non-limiting example modification to rigid ring structures for making non-linear molecular surfactants is the regio-selective chemical modification to a single facial side. In this example, a natural or synthetic rigid ring molecule (abietic acid) is modified through regio-selective control at a single planar facial side using ozone oxidation to generate hydroxyl functional groups. Regio-selective control is achieved through using a bi-phase suspension to drive single facial modification at the bi-phase interface. One equivalent of abietic acid was dissolved into a solution of dichloromethane to a 0.5M concentration, then dispersed thoroughly into a bi-phase suspension with water at a ratio of 3 to 1 volume dichloromethane to water. Using an ozone generator, ozone was bubbled through the mixing suspension for approximately 10 equivalents of $O_3$, ozone. Modification was monitored by FTIR and NMR spectroanalysis. Product comprised of a variation of single face hydroxylated abietic acid derivatives. These non-linear molecular surfactants include abieta-7,8,13,14-tetrahydroxy-18-oic-acid, abieta-7,8-dihydroxy-13-ene-18-oic-acid, and abieta-7-ene-13,14dihydroxy-18-oic-acid, which can be purified by means of column chromatography.

The example presented here is non-limiting and can be modified. Different reagents and non-linear rigid ring structure starting materials can be substituted to achieve other claimed non-linear surfactant molecular derivatives. Non-limiting examples of rigid ring structural molecules include polycyclic structures like polyaromatic hydrocarbons (e.g., anthracene, phenanthrene, chrysene, pyrene, benzo[a]pyrene, corannulene, coronene, etc.), steroids (e.g., cholic acid, chenodeoxycholic acid, progesterone, phytosterol, testosterone, dexamethasone, cholesterol, ergosterol, zymosterol, etc.), terpenes (e.g., abietic acid, limonene, humulene, taxadiene, pinene, humulene, cafestol, kahweol, cembrene, Lanosterol, etc.). Non-limiting examples of oxidative reagents include ozone, ozonides, superoxides, sodium perborate, $KMnO_4$, $H_2CrO_4$, pyridinium chlorochromate, peroxides (e.g., hydrogen peroxide, peroxymonosulfuric acid, peroxodisulfate, phosphorus oxides, sodium peroxide, benzoyl peroxide, ascaridole, Acetyl acetone peroxide, etc.), and can range in equivalent additions from 0.5 equivalent to 10,000 equivalents. Non-limiting solution concentrations range from 0.01 mM to 10M, and include non-limiting bi-phase solutions of water with hexanes, heptane, toluene, benzene, cyclohexane, etc. Those skilled in the art of chemistry are able to derive other synthetic methods and reagents that still fall under the intent of the disclosed non-linear molecular surfactants presented herein.

Non-linear molecular surfactants have a non-limiting application for use in surface modification of composite fillers for improving compounding of immiscible materials with surface incompatibilities, such as modification of cellulose nanofibers to favourably compound into polyethylene. Another non-limiting application for use of non-linear surfactant molecules includes modification of particles in creation of hierarchical non-linear surfactant particles.

A non-limiting example of a non-linear surfactant that highlights particle engineering includes the modification of particles with non-linear molecular surfactants, such as covalently bonding bile acids to the surface of an iron particle. Using 100 grams (1 equivalent) of spherical 1-3 µm iron powder suspended into a solution of 250 mL of toluene with vigorous mixing add 0.13 milligrams ($1.314 \times 10^{-4}$ weight equivalent)(10× surface area equivalent) of chenodeoxycholyl chloride at room temperature while under inert atmosphere. The acid halide of chenodeoxycholic acid reacts at the surface of the iron particle, attaching a pendant non-linear surfactant to the iron particle, and covalently attaching a pendant non-linear surfactant to the 3D rigid surface of the particle. This product has a non-limiting application for use in emulsions and dispersions chemistry, and surface coating materials where conformable surface response enables a new range of different phase interactions, such as a Pickering emulsion.

The example presented here is non-limiting and can be modified and use different reagents for producing the disclosed non-linear surfactant particles. Non-limiting examples of particle substrate include spherical and irregular shapes ranging in sizes of 1 nm to 1 cm and be comprised of elemental metals and non-metals, metal alloys, ceramics, and organic materials.

Non-limiting examples of coupling reactions for surface modification include acid halide coupling, silane coupling, acid anhydride coupling, click coupling, Gringard reaction, Corey House reaction, Heck reaction, Suzuki reaction, etc. Material reagents and reaction conditions will be dictated by the chemical coupling reaction. Non-linear surfactant molecular compounds that can be coupled to particles include those described herein.

Another non-limiting example of a non-linear surfactant that highlights hierarchical particle engineering includes the dissymmetric modification of a particle's surface (Janus Particles) with non-linear surfactants, such as covalently bonding abieta-7,8,13,14-tetrahydroxy-18-oic-acid to a limited region of the particle surface. A batch of $Al_2O_3$ 10-35 μm particles were pretreated by a method of liquid melt-solid suspension masking to cover and inhibit reaction from a partial region on the $Al_2O_3$ particles. This regio-controlling method keeps the surface modification to a limited region, creating dissymmetric modification. The modification was performed by suspending the masked $Al_2O_3$ particles (100 g, 1 weight equivalent) in dichloromethane (500 mL) with ($0.52\times10^{-4}$ weight equivalent)(10× surface area equivalent) abieta-7,8,13,14-tetrahydroxy-18-oic-acid derivative using Steglich esterification (EDCL, DMAP) at room temperature for 16 hours. After modification, the regio-controlling mask coating was removed by melt solvation in solution. The product non-linear amphiphilic Janus particle is capable of responding to environmental phase changes and switch its non-linear coated region from responding hydrophobic-to-hydrophilic or in the opposite.

The non-limiting examples presented here is non-limiting and can be modified and use different reagents for producing the disclosed non-linear surfactant particles. Non-limiting examples of particle substrate include elemental metals and non-metals, metal alloys, ceramics, polymers, and hybrids with particle sizes ranging from 1 nm to 1 cm and either uniform or irregular shapes (including spherical, cube, flakes, platelets, etc.). Non-limiting dissymmetric modification methods include adhesion masking, static masking, suspension melt-solid masking, single side directional activation coupling, bi-phase suspension controlled coupling, etc. Non-limiting non-linear molecular surfactants include abieta-7,8,13,14-tetrahydroxy-18-oic-acid, abieta-7,8-dihydroxy-13-ene-tetrahydroxy-18-oic-acid abieta-7-ene-13,14-dihydroxy-tetrahydroxy-18-oic-acid, terpene derivatives, squalene derivatives, steroid derivatives, polyaromatic hydrocarbon derivatives, etc. Non-limiting examples of coupling reactions for surface modification include acid halide coupling, silane coupling, acid anhydride coupling, click coupling, Gringard reaction, Corey House reaction, Heck reaction, Suzuki reaction, etc. Material reagents and reaction conditions will be dictated by the chemical coupling reaction It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall there between. The disclosure has been described with reference to the preferred embodiments. These and other modifications of the preferred embodiments as well as other embodiments of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

What is claimed:

1. A method for forming a modified particle that includes a plurality of non-linear surfactants comprising:
   a) providing particles, said particles formed of one or more materials selected from the group consisting of metal, ceramic, cermet, graphite, plastic, resins, and metalloids;
   b) providing a non-linear surfactant, said non-linear surfactant formed of a base compound with one or more functional groups, said base compound including a compound selected from the group consisting of abietic acid, polyaromatic hydrocarbons, steroids, terpenes, squalenes, terpenoids, sterols, graphenes and their derivatives, said one or more functional groups including one or more compounds selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls; and
   c) causing said non-linear surfactant to attach to a surface of said particles such that an outer surface of said particles is covered by 30-100% of said non-linear surfactant.

2. The method as defined in claim 1, wherein an average particle size of said particles is 1 nm to 1 cm.

3. The method as defined in claim 1, wherein said non-linear surfactant constitutes 0.0000001-10 wt. % of said modified particle.

4. A modified particle that includes a particle and non-linear surfactant connected to at least a portion of an outer surface of said particle; said particle formed of one or more materials selected from the group consisting of metal, ceramic, cermet, graphite, plastic, resins and metalloids; said non-linear surfactant comprises bi-functionalized molecules and/or particles having both hydrophobic and hydrophilic groups, said non-linear surfactant includes a base compound, said base compound is bi-functionalized with both hydrophilic and hydrophobic functional groups to obtain an amphiphilic particle; at least 30% of an outer surface of said particle is covered by said non-linear surfactant, wherein said base compound includes a compound selected from the group consisting of abietic acid, polyaromatic hydrocarbons, steroids, terpenes, squalenes, terpenoids, sterols, graphenes and their derivatives, at least one of said functional groups includes one or more compounds selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls.

5. The modified particle as defined in claim 4, wherein said base compound includes monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid, and their derivatives thereof.

6. The modified particle as defined in claim 4, wherein said base compound has an average particle size of 0.2-1,000 nm.

7. The modified particle as defined in claim 4, wherein said functional groups on said base compound form an ionic surface charge, a hydrophilic region, a hydrophobic region, a lipophilic region, an omniphobic region, and an omniphilic region.

8. The modified particle as defined in claim 4, wherein an average particle size of said particle is 1 nm to 1 cm.

9. The modified particle as defined in claim 4, wherein said non-linear surfactant constitutes 0.0000001-10 wt. % of said modified particle.

10. A method for forming a modified particle that includes a plurality of non-linear surfactants comprising:
  a. providing particles, said particles formed of one or more materials selected from the group consisting of metal, ceramic, cermet, graphite, plastic, resins, and metalloids;
  b. providing a non-linear surfactant, said non-linear surfactant comprises bi-functionalized molecules and/or particles having both hydrophobic and hydrophilic groups, said non-linear surfactant includes a base compound, said base compound is bi-functionalized with both hydrophilic and hydrophobic functional groups to obtain an amphiphilic particle; wherein said base compound includes a compound selected from the group consisting of abietic acid, polyaromatic hydrocarbons, steroids, terpenes, squalenes, terpenoids, sterols, graphenes and their derivatives, at least one of said functional groups includes one or more compounds selected from the group consisting of alcohols, carboxylic acids, esters, anhydrides, amides, nitriles, aldehydes, boron, thiols, amines, ethers, sulphides, alkenes, alkynes, alkyl halides, nitro, and alkyls; and,
  c. causing said non-linear surfactant to attach to a surface of a plurality of said particles such that an outer surface of said particle is covered by at least 30% of said non-linear surfactant.

11. The method as defined in claim 10, wherein said base compound includes monoterpenoids, sesquiterpenoids, diterpenoids, sesterterpenoids, triterpenoids, tetraterpenoids, polyterpenoids, monoterpenes, sesquiterpenes, diterpenes, sestererpenes, triterpenes, sesquarterpenes, tetraterpenes, polyterpenes, polyaromatic hydrocarbons, bile acids, abietic acid, and their derivatives thereof.

12. The method as defined in claim 10, wherein said base compound has an average particle size of 0.2-1,000 nm.

13. The method as defined in claim 10, wherein said functional groups on said base compound form an ionic surface charge, a hydrophilic region, a hydrophobic region, a lipophilic region, an omniphobic region, and an omniphilic region.

14. The method as defined in claim 10, wherein an average particle size of said particle is 1 nm to 1 cm.

15. The method as defined in claim 10, wherein said non-linear surfactant constitutes 0.0000001-10 wt. % of said modified particle.

* * * * *